(12) United States Patent
Haruna

(10) Patent No.: US 8,590,878 B2
(45) Date of Patent: Nov. 26, 2013

(54) CLAMP DEVICE

(75) Inventor: Yosuke Haruna, Kobe (JP)

(73) Assignee: Kosmek Ltd., Hyogo (JP)

( * ) Notice: Subject to any disclaimer, the term of this patent is extended or adjusted under 35 U.S.C. 154(b) by 11 days.

(21) Appl. No.: 13/395,613

(22) PCT Filed: Oct. 5, 2010

(86) PCT No.: PCT/JP2010/067406
§ 371 (c)(1),
(2), (4) Date: Mar. 12, 2012

(87) PCT Pub. No.: WO2011/046039
PCT Pub. Date: Apr. 21, 2011

(65) Prior Publication Data
US 2012/0174351 A1 Jul. 12, 2012

(30) Foreign Application Priority Data

Oct. 13, 2009 (JP) ................................. 2009-252393

(51) Int. Cl.
*B23Q 3/00* (2006.01)
(52) U.S. Cl.
USPC ........................................................ 269/309
(58) Field of Classification Search
USPC ................................................ 269/309, 310
See application file for complete search history.

(56) References Cited

U.S. PATENT DOCUMENTS

| | | |
|---|---|---|
| 6,527,266 B1 | 3/2003 | Yonezawa et al. |
| 2003/0111786 A1 | 6/2003 | Fries |
| 2010/0320664 A1 | 12/2010 | Kawakami |

FOREIGN PATENT DOCUMENTS

| | | |
|---|---|---|
| JP | 2001-38564 A | 2/2001 |
| JP | 2003-200326 A | 7/2003 |
| JP | 2005-7504 A | 1/2005 |
| JP | 2005 96012 A | 4/2005 |
| WO | 2009/101764 A1 | 8/2009 |

OTHER PUBLICATIONS

International Preliminary Report on Patentability and Written Opinion for PCT/JP2010/067406, dated Nov. 2, 2010.
International Search Report in PCT/JP2010/067406, Nov. 2, 2010.

*Primary Examiner* — Lee D Wilson
*Assistant Examiner* — Jamal Daniel
(74) *Attorney, Agent, or Firm* — Bacon & Thomas, PLLC

(57) ABSTRACT

A clamping apparatus has a piston inserted into a housing, a lock chamber located above the piston and a release chamber located below the piston. The clamping apparatus also has a diametrically expandable and contractible tapered sleeve attached to an annular plug portion projected upward from the housing and to be received in a tapered hole provided in a work pallet. An output rod is also inserted into a cylindrical hole of the plug portion and connected to the piston. Lock springs having compression coil springs are inserted into a plurality of spring-attachment holes formed in a recessed manner in an upper wall of the lock chamber, where the spring-attachment holes are communicatively connected to an outer surface of the housing by through holes, and pushing members are hermetically inserted into the through holes. The lock springs urge the sleeve through the pushing members with a predetermined force.

5 Claims, 1 Drawing Sheet

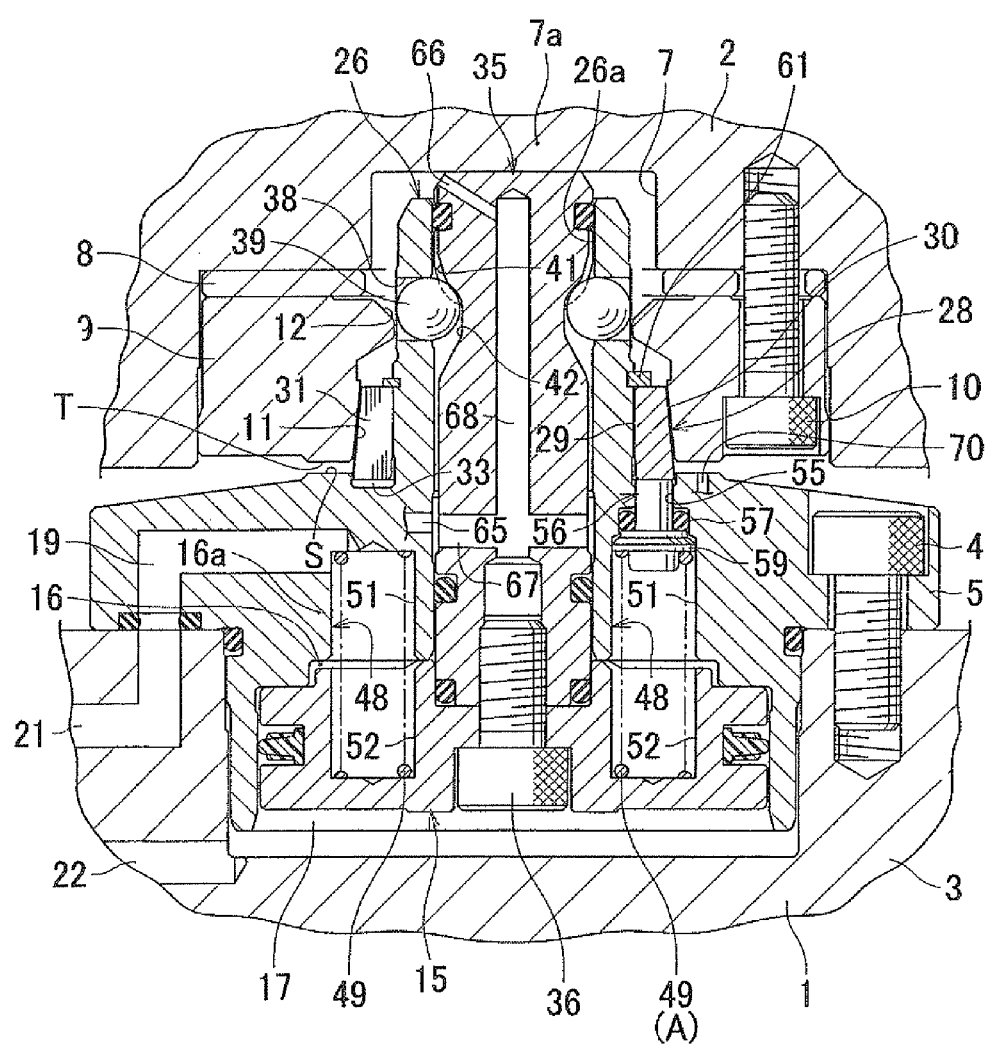

CLAMP DEVICE

TECHNICAL FIELD

The present invention relates to a clamping apparatus, and more particularly relates to an apparatus which fixes a movable block such as a work pallet or the like to a reference block such as a table of a machining center or the like while aligning the movable block to the reference block.

BACKGROUND ART

As such a clamping apparatus, conventionally, there is a clamping apparatus described in the Patent Document 1 (Japanese Unexamined Patent Publication No. 2001-38564). This conventional art is structured as follows.

A piston is vertically movably inserted into a housing of a reference block; a spring chamber for locking is formed above the piston; and in the spring chamber, a large number of coned disc springs vertically superposed on one another are attached. Further, below the piston, a release chamber where pressurized oil is supplied and discharged is formed. An annular plug portion is projected upward from the housing. Between an outer peripheral surface of the annular plug portion and a tapered hole of a movable block, a diametrically expandable and contractible tapered sleeve is interposed. A coned disc spring which urges the sleeve upward with a predetermined force is attached between an under surface of the sleeve and an outer surface of the housing. An output rod is vertically movably inserted into a cylindrical hole of the plug portion, and the output rod is connected to the piston.

CITATION LIST

Patent Literature

Patent Document 1: Japanese Unexamined Patent Publication No. 2001-38564

SUMMARY OF INVENTION

Technical Problem

In the above-described conventional art, when the apparatus is driven for clamping, the output rod lowers the movable block through engaging balls, and thereby the tapered hole provided in the movable block causes the sleeve, which is held at a raised position by an urging force of the coned disc spring, to diametrically contract thereby causing the sleeve to come into close contact with the plug portion, and subsequently, the sleeve is lowered against the urging force of the coned disc spring by a predetermined stroke, so that a supported surface of the movable block is brought into contact with a support surface of the housing. Thus, the above-described conventional art is advantageous in that the movable block is bound to the housing of the reference block horizontally and vertically; however, there remains room for improvement, in the following respect.

Since the coned disc spring of the above-described conventional art has a large spring constant, the descending stroke at the time of clamping is necessarily small. In this case, in order to ensure that the supported surface of the movable block is brought into contact with the support surface of the housing, it is necessary to strictly control dimensional deviations of components of the clamping apparatus, and this increases cost for machining these components.

In order to solve this problem, prior to the present invention, the present inventor conceived an idea of attaching a compression coil spring, in place of the coned disc spring, between the under surface of the sleeve and the outer surface of the housing. While the compression coil spring realizes a larger descending stroke since it has a smaller spring constant than that of the coned disc spring, the compression coil spring causes new detriment such that its larger total size makes the height of the clamping apparatus taller and foreign matter such as swarf or the like is likely to intrude into the spring.

An object of the present invention is to eliminate the various types of detriment.

Solution to Problem

In order to achieve the above object, for example as shown in FIG. 1, the present invention structures a clamping apparatus configured to align and fix a movable block 2 to a reference block 1, as follows.

A piston 15 is vertically movably inserted into the reference block 1 in a hermetical manner. A lock chamber 16 where pressurized fluid is supplied and discharged is formed above the piston 15, and a release chamber 17 where pressurized fluid is supplied and discharged is formed below the piston 15. An annular plug portion 26 is projected upward from the reference block 1, and the plug portion 26 is configured to be inserted into the movable block 2. A diametrically expandable and contractible sleeve 28 is provided, and a straight inner peripheral surface 29 of the sleeve 28 is vertically movably supported by an outer periphery of the plug portion 26, and a tapered outer peripheral surface 30 of the sleeve 28 is configured to be able to make an engagement with a tapered hole 11 provided in the movable block 2. An output rod 35 which moves the movable block 2 downward is vertically movably inserted into a cylindrical hole 26a of the plug portion 26, and the output rod 35 is connected to the piston 15. A spring-attachment hole 48 is formed in a recessed manner in an upper wall 16a of the lock chamber 16. A lock spring 49 which urges the piston 15 downward is inserted into the spring-attachment hole 48. Below the sleeve 28, an outer surface of the reference block 1 is communicatively connected to the spring-attachment hole 48 by a through hole 55. A pushing member 56 is hermetically inserted into the through hole 55 so as to face the sleeve 28. An advancing spring A constituted by a compression coil spring is arranged below the pushing member 56, and the advancing spring A urges the sleeve 28 upward through the pushing member 56 with a predetermined force.

The present invention provides following functions and effects.

In accordance with the present invention, since a position where the advancing spring urging the sleeve with the predetermined force is attached is not limited to between an under surface of the sleeve and the outer surface of the housing, it is possible to employ the compression coil spring having a smaller spring constant than that of a coned disc spring, and therefore a larger value can be set as a descending stroke of the sleeve at the time of clamping, compared to a case where the coned disc spring is employed.

Further, since a space for attaching the coned disc spring is no longer needed between the under surface of the sleeve and the outer surface of the housing, the height of the plug portion is reduced by the size of that space. This decreases bending moment exerted on a base portion of the plug portion by a machining force or the like at the time of machining a work, thereby enhancing rigidity of the clamping apparatus.

Furthermore, since the advancing spring of the present invention is attached inside the housing, it is possible to prevent an increase in the height of the clamping apparatus, and to prevent intrusion of foreign matter such as swarf or the like, as well.

In the present invention, it is preferable that the spring-attachment hole 48 includes a plurality of spring-attachment holes provided circumferentially at substantially equal intervals. In this case, the lock springs are capable of reserving the predetermined urging force in consistent with downsizing.

Further, in the present invention, the spring-attachment hole 48 may be no more than one hole formed into an annular shape.

In the present invention, it is preferable that at least one spring-attachment hole 48 out of the plurality of spring-attachment holes is communicatively connected to the outer surface of the reference block 1 by the through hole 55.

Further, in the present invention, it is more preferable that the lock spring 49 is constituted by a compression coil spring, and the lock spring 49 inserted into the at least one spring-attachment hole 48 communicatively connected by the through hole 55 also serves as the advancing spring. With this, one or more lock springs can be used for a force urging the sleeve upward, and therefore a degree of freedom in selection of the urging force is increased.

BRIEF DESCRIPTION OF DRAWINGS

FIG. 1 shows one embodiment of the present invention, and is an elevational sectional view of a clamping apparatus in a released state.

REFERENCE SIGNS LIST

1: reference block (clamp pallet), 2: movable block (work pallet), 11: tapered hole, 15: piston, 16: lock chamber, 16a: upper wall, 17: release chamber, 26: plug portion, 26a: cylindrical hole, 28: sleeve, 29: straight inner peripheral surface, 30: tapered outer peripheral surface, 35: output rod, 48: spring-attachment hole, 49: lock spring, 55: through hole, 56: pushing member, A: advancing spring.

DESCRIPTION OF EMBODIMENTS

Hereinafter, one embodiment of the present invention will be described with reference to FIG. 1.

A work pallet 2 serving as a movable block is arranged above a clamp pallet 1 serving as a reference block. A plurality of workpieces (not shown) can be attached to and detached from a top surface of the work pallet 2 by another clamping apparatus (not shown). Further, FIG. 1 shows a state where the work pallet 2 is attached to the clamp pallet 1.

The clamp pallet 1 includes: a base plate 3; and a housing 5 fixed to the base plate 3 by a plurality of bolts 4 (only one of them is shown here).

A shim member 8 and a ring member 9 are inserted into a larger diameter portion of a recessed portion 7 of the work pallet 2, and the shim member 8 and the ring member 9 are fixed to the work pallet 2 by a plurality of bolts 10 (only one of them is shown here). The ring member 9 includes a tapered hole 11 for positioning and an engaged portion 12 for clamping which are formed in order from the bottom. An inner peripheral portion of the ring member 9 is projected downward, and an under surface of this annular projected portion constitutes a supported surface T.

A piston 15 is vertically movably inserted into a lower portion of the housing 5 in a hermetical manner. A lock chamber 16 is formed above the piston 15, and a release chamber 17 is formed below the piston. The lock chamber 16 is communicatively connected to a first port 21 through a first spring-attachment hole 51 which will be described later and through a passage 19. Meanwhile, the release chamber 17 is communicatively connected to a second port 22. Compressed air is supplied to and discharged from each of the first port 21 and the second port 22.

An annular plug portion 26 is integrally projected upward from the housing 5, and the plug portion 26 is configured to be inserted into the ring member 9 of the work pallet 2.

An outer surface of the housing 5 is projected upward in the vicinity of an outer periphery of a bottom portion of the plug portion 26, and a top surface of this annular projected portion constitutes an annular support surface S.

A diametrically expandable and contractible sleeve 28 is arranged around an outer periphery of a lower portion of the plug portion 26. A straight inner peripheral surface 29 of the sleeve 28 is vertically movably supported by an outer peripheral surface of the plug portion 26. Meanwhile, a tapered outer peripheral surface 30 of the sleeve 28 is configured to be able to make an engagement with the tapered hole 11 of the work pallet 2. Here, a slit 31 is formed at a part of a peripheral wall of the sleeve 28, and thereby the straight inner peripheral surface 29 and the tapered outer peripheral surface 30 are diametrically expandable and contractible. Further, in this embodiment, the sleeve 28 diametrically contracts when an external force is exerted onto the tapered outer peripheral surface 30, and when the external force is removed, the sleeve 28 diametrically expands with its own elastic restoring force.

A lower portion of the sleeve 28 is inserted into an annular recessed groove 33 formed radially inner side of the support surface S.

An output rod 35 is vertically movably inserted into a cylindrical hole 26a of the plug portion 26. The output rod 35 is connected to the piston 15 by a bolt 36. At a midway portion of a peripheral wall of the plug portion 26, a plurality of through holes 38 are formed circumferentially at predetermined intervals, and in each of the through holes 38, an engaging ball 39 is held so as to be movable between a radially outward engagement position (not shown) and a radially inward disengagement position. On an upper portion of an outer peripheral surface of the output rod 35, a pressing surface 41 and a retreat groove 42 are formed with vertical continuity in correspondence with each engaging ball 39.

Further, in order to urge the piston 15 downward in addition to a downward force brought by compressed air supplied to the lock chamber 16, a plurality of spring-attachment holes 48 and a plurality of lock springs 49 are provided.

The spring-attachment holes 48 are constituted by: six first attachment holes 51 circumferentially provided in a recessed manner at substantially equal intervals in an upper wall 16a of the lock chamber 16; and six second attachment holes 52 circumferentially provided in a recessed manner at substantially equal intervals in the piston 15. Between bottom walls of the first attachment holes 51 and bottom walls of the corresponding second attachment holes 52, the lock springs 49 each constituted by a compression coil spring are inserted, respectively.

In three first attachment holes 51 out of the six first attachment holes 51, advancing means for pushing the sleeve 28 upward with a predetermined force are arranged.

Specifically, below the sleeve 28, there are formed through holes 55 which establish vertical communication between the outer surface of the housing 5 and the three first attachment holes 51. Into the through holes 55, pushing members 56 are hermetically inserted with sealing members 57, respectively, and upper ends of the pushing members 56 are brought to face the sleeve 28 from the underside thereof. Upper ends of the lock springs 49 are respectively brought into contact with spring seats 59 provided on lower portions of the pushing members 56. With this, the lock springs 49 urge the sleeve 28 upward with the predetermined force through the pushing members 56. Specifically, the lock springs 49 also serve as advancing springs A which urge the sleeve 28 with the predetermined force.

Note that, upward movement of the sleeve 28 over a predetermined distance is blocked by a retaining ring 61 provided around the plug portion 26.

Moreover, means for cleaning fitting surfaces of the clamping apparatus is provided. Specifically, a supply port 65 for compressed air for cleaning is provided in the housing 5, and a blowout hole 66 is provided obliquely and upwardly at an upper end portion of the output rod 35. The supply port 65 is communicatively connected to the blowout hole 66 through a horizontal passage 67 and a vertical passage 68 inside the output rod 35. Further, onto the support surface S of the housing 5, a nozzle 70 for seating detection is opened.

The clamping apparatus operates as follows. In the state of FIG. 1, compressed air is discharged from the lock chamber 16, and compressed air is supplied to the release chamber 17. Therefore, a pressure in the release chamber causes the piston 15 to raise the output rod 35 against the lock springs 49, thereby allowing each of the engaging balls 39 to face the retreat groove 42 and to move to the disengagement position shown in the FIGURE. Further, an urging force of the lock springs 49 which also serve as advancing springs A holds the sleeve 28 at a raised position through the pushing members 56. Furthermore, as shown in FIG. 1, when the work pallet 2 descends toward the clamp pallet 1, a top wall 7a of the recessed portion 7 is brought into contact with a top surface of the output rod 35, and the output rod 35 receives the work pallet 2.

When, under the state shown in FIG. 1, compressed air is discharged from the release chamber 17 and compressed air is supplied to the lock chamber 16, an air pressure in the lock chamber 16 and the urging force of the lock springs 49 strongly cause the output rod 35 to descend through the piston 15. Then, following the descent of the output rod 35, the work pallet 2 first descends by its own weight, and the tapered hole 11 of the ring member 9 is brought into contact with the tapered outer peripheral surface 30 of the sleeve 28. Thereby, the work pallet 2 slightly compresses, through the sleeve 28 and the pushing members 56, the lock springs 49 serving as the advancing springs A, and the tapered hole 11 is horizontally moved while aligning, so that an axis of the tapered hole 11 coincides with an axis of the plug portion 26.

Substantially at the same time, each pressing surface 41 of the output rod 35 presses the corresponding ball 39 to the radially outward engagement position, and its radial pressing force is converted to a downward force through the engaged portion 12, which downward force strongly lowers the work pallet 2. Then, the tapered hole 11 of the ring member 9 makes a strong tapering engagement with the tapered outer peripheral surface 30 of the sleeve 28 thereby causing the sleeve 28 to diametrically contract, so that the axis of the tapered hole 11 precisely coincides with the axis of the plug portion 26, and the sleeve 28 is lowered further against the urging force of the lock springs 49 serving as the advancing springs, and then the supported surface T is received by the support surface S. Thus, the work pallet 2 is horizontally bound by the plug portion 26 through the tapered outer peripheral surface 30 of the sleeve 28 and is vertically bound by the support surface S, and as a result, the work pallet 2 is precisely positioned and strongly fixed to the clamp pallet 1.

Note that, the clamping apparatus can be switched from the above clamping state to an unclamping state of FIG. 1 through the reversed procedure of the above-described procedure.

The above-described embodiment brings about following advantages.

Since a space for attaching the coned disc spring of the conventional art is no longer needed between an under surface of the sleeve 28 and the outer surface of the housing 5, the height of the plug portion 26 can be reduced by the size of this space. This decreases bending moment exerted on a base portion of the plug portion 26 by a machining force or the like at the time of machining a work, thereby enhancing rigidity of the clamping apparatus.

Further, the above-described embodiment can be modified as follows.

The number of the plurality of spring-attachment holes 48 may be two to five, or seven or more, instead of six, which is exemplarily mentioned. Moreover, the number of the lock springs 49 which also serve as the advancing springs may be at least one. Further, the second attachment holes 52 provided in the piston 15 may be omitted.

Instead of the plurality of spring-attachment holes 48 circumferentially arranged, the following structure is possible. Specifically, one spring-attachment hole is constituted by: one annular first attachment hole formed in the upper wall 16a of the lock chamber 16; and one annular second attachment hole formed in the piston 15. Into the first attachment hole and the second attachment hole, at least one lock spring constituted by a compression coil spring having a large diameter is inserted. A part of the bottom wall (an upper surface in the FIGURE) of the first attachment hole is communicatively connected to the outer surface of the housing 5 by the through hole 55. The pushing member 56 hermetically inserted into the through hole 55 is urged upward by an advancing spring constituted by another compression coil spring.

The sleeve 28 is not limited to the exemplified annular integral structure, but may be a plurality of divided portions arranged annularly. Moreover, an engaging member of the clamping apparatus may be a collet which engages with a straight engaging hole by a frictional force or a plastic deformation force, instead of the exemplified balls 39 which engage with the engaged portion 12 constituted by a tapered hole.

Pressurized fluid for locking and releasing may be nitrogen gas or the like, or liquid such as pressurized oil, instead of the compressed air.

The reference block may be a table of a machining center or various machines instead of the exemplified clamp pallet 1. Further, the movable block may be a workpiece instead of the exemplified work pallet 2. The reference block and the movable block may be arranged in a vertically reversed manner, and may be connected to each other horizontally or obliquely instead of vertically as exemplified.

Further, it is a matter of course that the clamping apparatus of the present invention can be used for clamping not only the work pallet or the workpiece but also a metal die, an attachment, or the like.

Furthermore, it is a matter of course that other changes or alterations can be made on the present invention within the scope of envisagement of one skilled in the art.

The invention claimed is:

1. A clamping apparatus configured to align and fix a movable block (2) to a reference block (1), the clamping apparatus comprising:

a piston (15) which is vertically movably inserted into the reference block (1) in a hermetical manner;
a lock chamber (16) which is formed above the piston (15) and where pressurized fluid is supplied and discharged;
a release chamber (17) which is formed below the piston (15) and where pressurized fluid is supplied and discharged;
an annular plug portion (26) which is projected upward from the reference block (1) so as to be inserted into the movable block (2);
a diametrically expandable and contractible sleeve (28) which includes a straight inner peripheral surface (29) vertically movably supported by an outer periphery of the plug portion (26) and a tapered outer peripheral surface (30) making an engagement with a tapered hole (11) provided in the movable block (2);
an output rod (35) which is vertically movably inserted into a cylindrical hole (26a) of the plug portion (26) and is connected to the piston (15) to move the movable block (2) downward;
a spring-attachment hole (48) which is formed in a recessed manner in an upper wall (16a) of the lock chamber (16);
a lock spring (49) which is inserted into the spring-attachment hole (48) so as to urge the piston (15) downward;
a through hole (55) which communicatively connects an outer surface of the reference block (1) to the spring-attachment hole (48) below the sleeve (28);
a pushing member (56) which is hermetically inserted into the through hole (55) so as to face the sleeve (28); and
an advancing spring (A) which is constituted by a compression coil spring and is arranged below the pushing member (56) so as to urge the sleeve (28) upward through the pushing member (56) with a predetermined force.

2. The clamping apparatus according to claim 1, wherein the spring-attachment hole (48) comprises a plurality of spring-attachment holes provided circumferentially at substantially equal intervals.

3. The clamping apparatus according to claim 1, wherein the spring-attachment hole (48) is no more than one hole formed into an annular shape.

4. The clamping apparatus according to claim 2, wherein at least one spring-attachment hole (48) out of the plurality of spring-attachment holes is communicatively connected to the outer surface of the reference block (1) by the through hole (55).

5. A clamping apparatus configured to align and fix a movable block (2) to a reference block (1), the clamping apparatus comprising:
a piston (15) which is vertically movably inserted into the reference block (1) in a hermetical manner;
a lock chamber (16) which is formed above the piston (15) and where pressurized fluid is supplied and discharged;
a release chamber (17) which is formed below the piston (15) and where pressurized fluid is supplied and discharged;
an annular plug portion (26) which is projected upward from the reference block (1) so as to be inserted into the movable block (2);
a diametrically expandable and contractible sleeve (28) which includes a straight inner peripheral surface (29) vertically movably supported by an outer periphery of the plug portion (26) and a tapered outer peripheral surface (30) making an engagement with a tapered hole (11) provided in the movable block (2);
an output rod (35) which is vertically movably inserted into a cylindrical hole (26a) of the plug portion (26) and is connected to the piston (15) and configured to move the movable block (2) downward when engaged with the movable block (2);
a plurality of spring-attachment holes (48) which are formed in a recessed manner in an upper wall (16a) of the lock chamber (16), wherein the plurality of spring-attachment holes (48) are provided circumferentially at substantially equal intervals;
a plurality of lock springs (49), wherein at least one lock spring of the plurality of lock springs is inserted into the spring-attachment hole (48) so as to urge the piston (15) downward;
a through hole (55) which communicatively connects an outer surface of the reference block (1) to at least one spring-attachment hole (48) below the sleeve (28); and
a pushing member (56) which is hermetically inserted into the through hole (55) so as to face the sleeve (28),
wherein at least one lock spring (49) of the plurality of lock springs is a compression coil spring that is inserted into the at least one spring-attachment hole (48) communicatively connected by the through hole (55) to serve as an advancing spring (A) so as to urge the sleeve (28) upward through the pushing member (56) with a predetermined force.

* * * * *